(No Model.)
J. A. J. SHULTZ.
LINK DRIVING BELT.
No. 425,704. Patented Apr. 15, 1890.
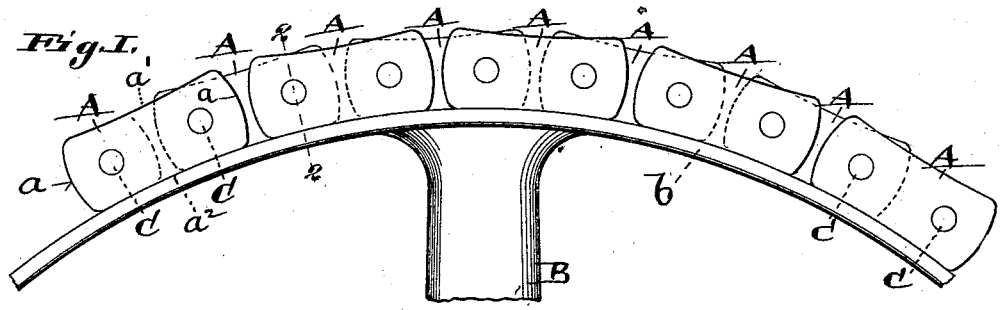
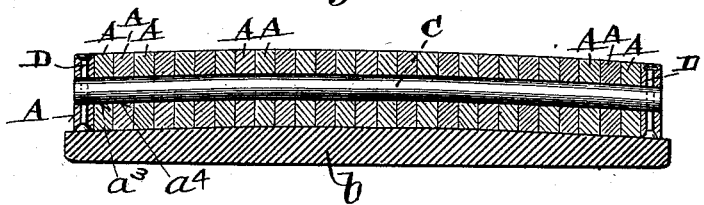
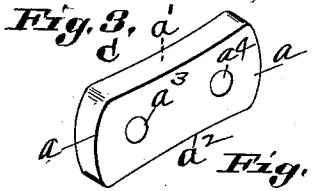
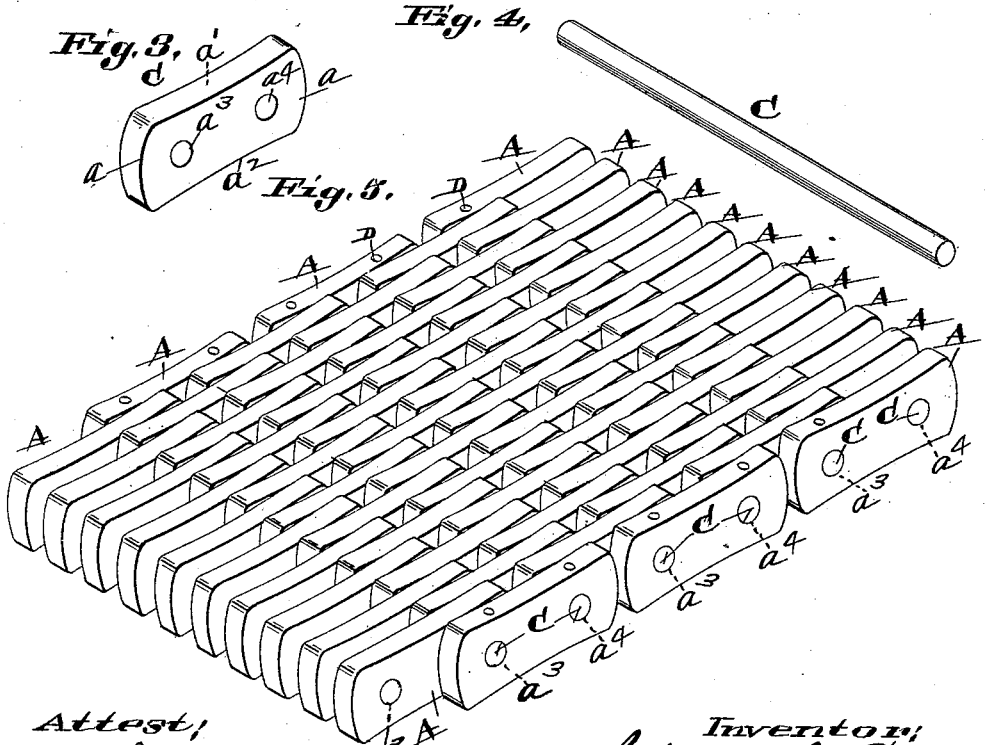
Attest:
B. H. Rhy
S. W. E. Sanford
Inventor:
John A. J. Shultz
by E. D. Moody
his atty

UNITED STATES PATENT OFFICE.

JOHN A. J. SHULTZ, OF ST. LOUIS, MISSOURI, ASSIGNOR TO THE SHULTZ BELTING COMPANY, OF SAME PLACE.

LINK DRIVING-BELT.

SPECIFICATION forming part of Letters Patent No. 425,704, dated April 15, 1890.

Application filed December 3, 1889. Serial No. 332,443. (No model.)

*To all whom it may concern:*

Be it known that I, JOHN A. J. SHULTZ, of St. Louis, Missouri, have made a new and useful Improvement in Link Driving-Belts, of which the following is a full, clear, and exact description.

Hitherto in the manufacture of a leathern link belt the links have been united and formed into the belt by means of bolts or rods of a substantially inelastic character. The bolts or rods extend crosswise in the belt, and to enable it to be used upon a crowned pulley-rim the custom has usually been to form the belt in two sections arranged side by side and united by means of a flexible connection, which permits of the sections turning upon each other sufficiently to come into contact with the pulley-rim—that is, the bolts or rods referred to do not extend through the entire width of the belt, but each section has its own bolts or rods, which extend through its width only. Such a construction is objectionable. It is not sufficiently pliable to meet the requirements of a driving-belt. Even when in the form of sections hinged together, as described, it cannot well be made to bear upon the pulley-rim at its apex, nor even at the sides, respectively, of the apex. Moreover, the bolts or rods employed have been heavy metallic ones, in consequence of which the weight of the belt has been materially increased. This excessive weight in turn not only causes unusual wear upon the pulley-journals, but also operates to hinder the belt from being used save in a horizontal position, and then only when the slack side can be run on top. To mitigate, if not to obviate, these objections and to provide an improved driving-belt is the aim of the present improvement, which consists, mainly, in the means for reuniting the links, substantially as is hereinafter set forth and claimed, aided by the annexed drawings, making part of this specification, in which—

Figure 1 is a view showing in side elevation a portion of a pulley-rim with a portion of the improved belt applied thereto; Fig. 2, a cross-section on the line 2 2, Fig. 1; Fig. 3, a view in perspective of one of the belt-links; Fig. 4, a view in perspective of one of the bolts used to unite the links; Fig. 5, a view in perspective of a portion of the belt.

The same letters of reference denote the same parts.

The links A, considered generally, resemble the links often used in link driving-belts, and the improvement can be carried out largely with the aid of almost any of the links upon the market. I prefer, however, the special form of link shown—namely, an approximately rectangular link—having its end edges $a\ a$ slightly convex and its upper and under edges $a'\ a^2$ slightly concave to correspond to the curvature of the rim $b$ of the pulley B, as shown substantially in Fig. 1. The link is perforated at $a^3\ a^4$ to receive the bolts C.

The mode of combining the links and bolts to form the belt is shown more clearly in Figs. 5 and 2, the links being interlapped, as shown, to form a belt of any desired width and length, and the bolts extending laterally through the entire width of the series of links, passing through the perforations $a^3\ a^4$, as shown, and to better confine the bolts in place the outside links of the series are secured to the bolts, so as not to slip off therefrom. A mode of securing the links is shown, a nail D being driven edgewise through the link into the bolt. The result obtained is a belt uniformly flexible throughout its entire width and adapted to fit the curvature of the pulley-rim in both directions and to conform to all styles of pulley-faces—flat or crowned or more or less crowned; a belt, also, which is more than flexible; a belt which is elastic and resilient, and which, after being bent or twisted, automatically reassumes its form, thereby enabling the belt to keep its place upon the pulleys and rendering it capable of being run in all positions in which belts are likely to be used—horizontally, perpendicularly, and in a twist. The belt, further, is light in weight. It also can be reversed. When worn upon one of its sides, it can be turned and its opposite side run next to the pulley-face.

I prefer to make the links and the bolts of leather; but other substances suited to an elastic driving-belt such as described can be used for the links and also for the bolts. Various forms of leather, including rawhide and partially-tanned leather, are available both for links and bolts.

So far as the use of an elastic bolt or rivet for jointing the links together and uniting them laterally is concerned, I desire not to be restricted to just such a link driving-belt as is here shown, for such a bolt or rivet can be used in belts made in sections such as hereinbefore referred to, each section having its own elastic bolts or rivets, and the two sections thus constructed be hinged laterally together in the same manner as they are now hinged together when rigid bolts or rivets are used.

I am aware the use of flexible rivets has been suggested; but a simply flexible rivet will not answer my purpose. It should not only be capable of being flexed. It should also be resilient, that the belt may recover its form as soon as it has passed the point at which it has to be bent or twisted.

I claim—

A driving-belt composed of a series of independent leather links and leather rods or pintles, the ends of said rods being secured to the outside or marginal links by fastenings passed through the links and rods, substantially as set forth.

Witness my hand this 30th day of November, 1889.

JOHN A. J. SHULTZ.

Witnesses:
C. D. MOODY,
D. W. A. SANFORD.